United States Patent [19]

Devona et al.

[11] 4,118,356

[45] Oct. 3, 1978

[54] COPOLYMERS OF ETHYLENE AND VINYL ACETATE OF INCREASED INSOLUBILITY

[75] Inventors: James E. Devona, Hoffman Estates; Abdullah M. Rokadia, Schaumburg, both of Ill.

[73] Assignee: DeSoto, Inc., Des Plaines, Ill.

[21] Appl. No.: 426,285

[22] Filed: Dec. 18, 1973

[51] Int. Cl.$^2$ .................. C08L 31/04; C08L 23/08; C08L 27/06

[52] U.S. Cl. .................. 260/29.6 RB; 260/29.6 RW; 260/29.6 T; 260/29.6 TA; 260/897 A; 260/899

[58] Field of Search .................. 260/29.6 R, 29.6 RB, 260/29.6 RW, 29.6 T, 29.6 TA, 29.6 XA, 897 A

[56] References Cited

U.S. PATENT DOCUMENTS

| | | | |
|---|---|---|---|
| 3,404,113 | 10/1968 | Lindemann et al. | 260/29.6 T |
| 3,440,199 | 4/1969 | Lindemann et al. | 260/29.6 RW |
| 3,526,538 | 9/1970 | Lindemann et al. | 260/29.6 T X |
| 3,547,845 | 12/1970 | Pinkney | 260/29.6 TA X |
| 3,632,542 | 1/1972 | Fox et al. | 260/29.6 T |
| 3,642,680 | 2/1972 | Jennings et al. | 260/29.6 RW |
| 3,644,262 | 2/1972 | Stehle et al. | 260/29.6 R |
| 3,660,332 | 5/1972 | Kamio et al. | 260/29.6 T X |
| 3,714,099 | 1/1973 | Biale | 260/29.6 TA |
| 3,736,283 | 5/1973 | Taylor | 260/29.6 TA X |

*Primary Examiner*—Walter C. Danison
*Attorney, Agent, or Firm*—Dressler, Goldsmith, Clement, Gordon & Shore, Ltd.

[57] ABSTRACT

Ethylene and vinyl acetate are copolymerized in aqueous emulsion using redox catalysts by copolymerizing vinyl acetate and ethylene monomers in an emulsion containing at least 10% by weight of emulsified particles of a copolymer of ethylene and vinyl acetate, with the unreacted vinyl acetate and ethylene providing a concentration of at least 10% by weight of unreacted monomers in the emulsion together with redox catalysts to cause a vigorous exothermic reaction. The copolymer exhibits substantially increased insolubility in organic solvents and aqueous caustic.

8 Claims, No Drawings

COPOLYMERS OF ETHYLENE AND VINYL ACETATE OF INCREASED INSOLUBILITY

The present invention relates to the production of emulsion copolymers of ethylene and vinyl acetate which possess new and unique properties.

The copolymerization of ethylene and vinyl acetate by redox polymerization in aqueous emulsion is well known, the copolymer product being a thermoplastic solvent-soluble material. This copolymerization is illustrated in Beardsley U.S. Pat. No. 3,578,618 to DuPont where the intrinsic viscosity of the product is defined by its solubility in benzene (1 to 2.5 deciliters per gram measured in benzene at 30° C.) though methyl ethyl ketone, which is a stronger solvent, is also frequently used. In many utilities it is desired to enhance the ultimate solvent resistance, and reactive monomers have been included in the prior copolymers to provide desired insolubilization through a subsequent cure, as illustrated in Lindemann U.S. Pat. Nos. 3,380,851 and 3,440,200.

Thus, the emulsion copolymers of ethylene and vinyl acetate are well known to exhibit extensive solvent solubility, particularly in benzene and methyl ethyl ketone, and this is so regardless of the presence or absence of minor proportions of third monomers. Curiously, the emulsion copolymers of this invention exhibit substantial insolubility in benzene, acetone, and methyl ethyl ketone. Instead of dissolving extensively and easily in these solvents at room temperature, an insoluble flock is formed and the material becomes gelatinous so that very little of the copolymer passes through a standard filter paper by gravity when 1 gram of latex is dissolved in 100 grams of acetone. By using a very dilute solution in acetone, and by washing the filtrate in additional acetone, the gelatinous material is penetrated, but more than 30% of the copolymer remains insoluble in acetone which is selected for its water miscibility. Conventional copolymers contain less than 20% of acetone insoluble material in the same test.

The prior art emulsion copolymers are known for use in aqueous latex paints where they provide a less costly replacement for emulsion copolymers of various type, especially copolymers of vinyl acetate and butyl acrylate. These copolymers thus provide a standard against which the ethylene-vinyl acetate copolymers are logically measured. Scrub resistance is especially important in such utility and the ethylene-vinyl acetate emulsions commercially available for paint utility possess only about 80% of the scrub resistance provided by the butyl acrylate-containing standard. In contrast, the ethylene-vinyl acetate copolymers of this invention possess better scrub resistance than the butyl acrylate-containing standard.

It is also known, as shown in Fox et al. U.S. Pat. No. 3,632,542 that the ethylene-vinyl acetate emulsion copolymers lack resistance to aqueous caustic, the copolymer losing in excess of 26% of its weight upon exposure to 25% aqueous caustic for 4 days at 50° C. as set forth in the test detailed in said patent unless at least 10% of vinyl chloride is included in the copolymer. In this invention, and by the same test, less than 2% weight loss is experienced with over 99% of the copolymer consisting of ethylene and vinyl acetate. The addition of vinyl chloride of these copolymers results in a slightly greater weight loss.

Thus, the copolymers of this invention, while they contain the same monomers in the same proportions taught in the prior art, are structurally different because their properties are different.

In accordance with this invention, an aqueous emulsion containing at least 10% by weight of emulsified particles of a copolymer of at least 50% by weight of vinyl acetate and 5–40% by weight of ethylene, has introduced into the copolymer emulsion vinyl acetate and ethylene monomers to provide at least 10% by weight of unreacted monomers in the emulsion, and redox catalysts are included to cause these unreacted monomers to copolymerize in the presence of the concentration of copolymer particles to produce a vigorous, exothermic reaction.

The product of this reaction exhibits significant insolubility in benzene, acetone, and methyl ethyl ketone, and it is resistant to caustic attack, showing a weight loss of less than 5%, preferably less than 2%, in 25% caustic as will be more fully explained hereinafter. As a result, the copolymers of this invention are entirely unlike the products of the prior art in which the additional copolymerization is conducted slowly and without any vigorous exothermic reaction after copolymer particles are present.

Referring more particularly to the monomer components of the copolymer, this invention is primarily concerned with the use of vinyl acetate to constitute a major weight proportion of the copolymer. On the other hand, other vinyl esters with aliphatic monocarboxylic acid esters, such as vinyl butyrate and vinyl versatate, may be employed, particularly to provide a partial replacement for the vinyl acetate component.

The main component which is combined with the vinyl acetate in the copolymer is ethylene, and it is used in a proportion of 5–40%, based on the weight of the copolymer. As pointed out hereinbefore, this invention is particularly concerned with aqueous latex paints, and for this purpose, the proportion of ethylene is preferably in the range of 8–20%.

In addition to the two essential components referred to hereinbefore, vinyl chloride in an amount up to 30% by weight, but preferably in an amount of from 3–10% by weight is present. Curiously, the addition of vinyl chloride increases the organic solvent solubility of the conventional copolymer. However, the presence of vinyl chloride is particularly contemplated in this invention for the purpose of upgrading the latex paint properties. However, and as pointed out hereinbefore, the addition of vinyl chloride to the copolymers of this invention somewhat reduces the capacity to resist aqueous caustic attack, whereas the opposite properties are obtained when vinyl chloride is added to the conventional ethylene-vinyl acetate copolymers.

As has been stressed hereinbefore, the vinyl acetate ethylene copolymers of this invention are uniquely characterized by considerable resistance to the organic solvents which are commonly used for dissolving the conventional ethylene-vinyl acetate emulsions. Despite this extensive solvent insolubility, the emulsion copolymer particles of this invention coalesce readily, even on air drying, so as to provide, upon appropriate pigmentation, excellent aqueous latex paints. This capacity for ready coalescence of a solvent insoluble copolymer is surprising.

Despite the fact that the copolymers of the invention exhibit considerable solvent insolubility and resistance to caustic in the absence of any additional cross-linking action, reactive monomers in small amount, up to about 2% by weight may be included. These reactive monomers are well known, including N-methylol acrylamide, and similar monoethylenic monomers providing a reactive $CH_2OH$ group, acrylamide, and similar monoethylenic amides, hydroxy ethyl methacrylate and similar monoethylenic hydroxy functional monomers. Also, and as is conventional, a small proportion, up to about 5% by weight, but preferably not in excess of 2% by weight, may be constituted by an ethylenically unsaturated acid, such as acrylic acid, methacrylic acid, or other monoethylenic carboxylic acid, or vinyl sulfonic acid to illustrate other monoethylenic acids. These acids provide freeze-thaw stability, somewhat better adhesion, and assist in providing emulsion stability in the presence of a base, such as triethyl amine or other amine.

The copolymerization reaction in this invention is carried out in aqueous emulsion using redox catalysts, these being conventional.

The distinguishing feature in the aqueous emulsion copolymerization in this invention is the finding that a considerable proportion of unreacted ethylene and vinyl acetate are caused to copolymerize upon preformed emulsion copolymer particles. At least 10% by weight of unreacted monomers should be present, based on the weight of the emulsion and the addition of redox catalysts to the mixture of unreacted monomers and polymers is regulated to cause a vigorous exothermic reaction which is easily noted by an at least 10° C. rise in the temperature of the emulsion. In preferred practice, the concentration of unreacted monomer is at least 20%, based on the weight of the emulsion.

The invention is illustrated in the examples which follow in which all parts are by weight unless otherwise specified.

| Water | 4417.0 | grams |
|---|---|---|
| Hydroxyethyl cellulose (Note 1) | 70.1 | " |
| $NaHCO_3$ | 13.0 | " |
| Sodium lauryl sulfate, 30% aqueous solution (Note 2) | 58.4 | " |
| Octylphenoxypoly(ethylenoxy) ethanol, 9.5 moles average ethylene oxide units (Note 3) | 33.0 | " |
| Octylphenoxypoly(ethylenoxy) ethanol, 40 moles average ethylene oxide units, 70% active (Note 4) | 31.4 | " |
| $FeSO_4 \cdot 7H_2O$ | .007 | " |
| $(NH_4)_2S_2O_8$ | 7.0 | " |
| Vinyl Acetate | 2330.0 | " |
| Glacial methacrylic acid | 6.5 | " |

Note 1 - Cellosize WP-09L (Union Carbide Corp.) may be used to provide the hydroxy ethyl cellulose.
Note 2 - Sipex UB (Americal Alcolac Co.) may be used to provide the sodium lauryl sulfate.
Note 3 - Triton X-100 (Rohm & Haas) may be used to provide the octylphenoxypoly(ethylenoxy)ethanol.
Note 4 - Triton X-405 (Rohm & Haas) may be used to provide the octylphenoxypoly(ethylenoxy)ethanol.

The reactor was flushed with ethylene, and the agitator was set at 300 RPM. The temperature was raised to 40° C., and ethylene was added to a pressure of 550 psig. Then 112.5 grams of 4% aqueous sodium formaldehyde sulfoxylate solution were added followed by 75 grams of water. After seven minutes, the temperature began to rise, reaching 65° C. after an additional 12 minutes. Then 50 grams of 4% aqueous $(NH_4)_2S_2O_8$ were added followed by 75 grams of water. This caused an additional temperature rise to 77° C. The latex was cooled to 40° C. leaving an ethylene pressure at 40° C. of 475 psi and the following materials were added:

| Water | 600.0 | grams |
|---|---|---|
| Octylphenoxypoly(ethylenoxy) ethanol, 9.5 moles average ethylene oxide units (note) 3) | 46.2 | grams |
| Octylphenoxypoly(ethylenoxy) ethanol, 40 moles average ethylene oxide units, 70% active (Note 4) | 44.0 | grams |
| Vinyl acetate | 2599.5 | grams |
| 4% $(NH_4)_2S_2O_8$ | 150.0 | grams |

The agitator was adjusted to 350 RPM, and the temperature was brought to 41° C. Then 100 grams of 4% sodium formaldehyde sulfoxylate were added followed by 100 grams of water. After one minute, the temperature began to increase, reaching 65° C. after an additional six minutes. Then 50 grams of 4% $(NH_4)_2S_2O_8$ were added followed by 150.0 grams of water. This caused a further temperature rise to a peak of 95° C. in three minutes. The latex was cooled to 40° C., leaving an ethylene pressure above 350 psig, and the following materials were added.

| Water | 600.0 | grams |
|---|---|---|
| Octylphenoxypoly(ethylenoxy) ethanol, 9.5 moles average ethylene oxide units (Note 3) | 52.2 | grams |
| Octylphenoxypoly(ethylenoxy) ethanol, 40 moles average ethylene oxide units, 70% active (Note 4) | 49.7 | grams |
| Vinyl acetate | 3203.5 | grams |
| Glacial methacrylic acid | 6.5 | grams |
| 4% $(NH_4)_2S_2O_8$ | 200.0 | grams |

The agitator was adjusted to 400 RPM; the temperature was brought to 42° C., and the pressure was raised to 550 psig by the addition of more ethylene to the reactor. One hundred grams of 4% sodium formaldehyde sulfoxylate were then added, followed by 100 grams of water. After 17 minutes, the temperature began to increase, reaching 65° C. after 5 minutes. Then 100 grams of 4% $(NH_4)_2S_2O_8$ were added followed by 100 grams of water. This caused an additional temperature rise to 82° C. The temperature was increased to 85° C. by applying heat to the reactor. Then 100 grams of 4% $(NH_4)_2S_2O_8$ were added followed by 100 grams of water, and the latex was held at 85° C. for one hour. After cooling and expelling the emulsion from the reactor, its properties were determined as follows:

| Non-Volatile Material | 56.92% |
|---|---|
| pH | 4.0 |
| Brookfield Viscosity | 448 centipoises |
| Average Particle Diameter | 0.37 micron |
| Weight Percent Ethylene in Polymer (nmr) | 14% |

The polymer was significantly insoluble and a large number of gel particles formed in acetone, methyl ethyl ketone, and benzene.

The resistance of a one-inch square film of the dried latex to aqueous alkali was determined according to the method of U.S. Pat. No. 3,632,542.

The weight loss was 1.91%.

In order to measure solvent insolubility, a specimen of the latex weighing between 0.1 and 0.2 gram is weighed into a 250 ml. beaker and 100 ml. of acetone are added. The beaker is covered and stirred with an automatic stirring bar for one hour. The acetone containing many flock particles is filtered through a fluted filter paper (Eaton-Dikeman, Grade No. 513, Size 24 cm), and the residue is washed with several portions of fresh acetone in order to break the gelatinous material and force as much of the dissolved polymer as possible through the filter paper. The filtrate and washings are collected in a beaker, and the acetone is evaporated to dryness in a 105° C. oven. The product in the beaker is cooled to room temperature and weighed. The weight of the beaker is subtracted, and the proportion of acetone soluble material is calculated. By knowing the proportion of solids in the original latex, the proportion of insoluble material can be obtained by subtraction. In this fashion, the product produced as described hereinbefore contained 39% by weight of acetone insoluble polymer.

Note 1 - Cellosize WP-09L (Union Carbide Corp.) may be used to provide the hydroxy ethyl cellulose.

Note 2 - Sipex UB (American Alcolac Co.) may be used to provide the sodium lauryl sulfate.

Note 3 - Triton X-100 (Rohm & Haas) may be used to provide the octylphenoxypoly(ethylenoxy)ethanol.

Note 4 - Triton X-405 (Rohm & Haas) may be used to provide the octylphenoxypoly(ethylenoxy)ethanol.

EXAMPLE 2

Batch Redox Preparation of Vinyl Acetate-Ethylene-Vinyl Chloride Latex in 3 Stages The following materials were charged to a five gallon stainless steel autoclave equipped with a stirrer and temperature controls:

| Water | 4417.0 | grams |
|---|---|---|
| Hydroxyethyl cellulose (see Note 1 of Ex. 1) | 70.1 | grams |
| NaHCO$_3$ | 13.0 | grams |
| Sodium lauryl sulfate, 30% aqueous solution (see Note 2 of Ex. 1) | 58.4 | grams |
| Octylphenoxypoly(ethylenoxy)ethanol, 9.5 moles average ethylene oxide units (see Note 3 of Ex. 1) | 33.0 | grams |
| Octylphenoxypoly(ethylenoxy)ethanol, 40 moles average ethylene oxide units, 70% active (see Note 4 of Ex. 1) | 31.4 | grams |
| FeSO$_4$ . 7H$_2$O | .007 | grams |
| (NH$_4$)$_2$S$_2$O$_8$ | 7.0 | grams |
| Vinyl acetate | 2330.0 | grams |
| Glacial methacrylic acid | 6.5 | grams |

The reactor was flushed with ethylene, and the agitator was set at 300 RPM. The temperature was raised to 40° C., and ethylene was added to a pressure of 550 psig. Then 112.5 grams of 4% aqueous sodium formaldehyde sulfoxylate solution were added followed by 75 grams of water. After seven minutes, the temperature began to rise, reaching 65° C. after an additional eight minutes. Then 50 grams of 4% aqueous (NH$_4$)$_2$S$_2$O$_8$ were added followed by 75 grams of water. This caused an additional temperature rise to 98° C. The latex was cooled to 40° C., and the following materials were added:

| Water | 600.0 | grams |
|---|---|---|
| Octylphenoxypoly(ethylenoxy)ethanol, 9.5 moles average ethylene oxide units (see Note 3 of Ex. 1) | 46.2 | grams |
| Octylphenoxypoly(ethylenoxy)ethanol, 40 moles average ethylene oxide units, 70% active (see Note 4 of Ex. 1) | 44.0 | grams |
| Vinyl acetate | 1890.3 | grams |
| Vinyl chloride | 709.2 | grams |
| 4% (NH$_4$)$_2$S$_2$O$_8$ | 150.0 | grams |

The agitator was adjusted to 350 RPM, and the temperature was brought to 41° C. Then 100 grams of 4% sodium formaldehyde sulfoxylate were added followed by 100 grams of water. After 13 minutes, the temperature began to increase, reaching 67° C. after an additional 22 minutes. Then 50 grams of 4% (NH$_4$)$_2$S$_2$O$_8$ were added followed by 150 grams of water. This caused a further temperature rise to 79° C. in five minutes. The latex was cooled to 40° C., and the following materials were added.

| Water | 600.0 grams |
|---|---|
| Octylphenoxypoly(ethlenoxy)ethanol, 9.5 moles average ethylene oxide units (see Note 3 of Ex. 1) | 52.2 grams |
| Octylphenoxypoly(ethylenoxy)ethanol, 40 moles average ethylene oxide units, 70% active (see Note 4 of Ex. 1) | 49.7 grams |
| Vinyl acetate | 3203.5 grams |
| Glacial methacrylic acid | 6.5 grams |
| 4% (NH$_4$)$_2$S$_2$O$_8$ | 200.0 grams |

The agitator was adjusted to 400 RPM; the temperature was brought to 43° C., and the pressure was raised to 560 psig by the addition of more ethylene to the reactor. One hundred grams of 4% sodium formaldehyde sulfoxylate were then added, followed by 100 grams of water. After six minutes, the temperature began to increase, reaching 65° C. after seven minutes. Then 100 grams of 4% (NH$_4$)$_2$S$_2$O$_8$ were added followed by 100 grams of water. This caused an additional temperature rise to 83.5° C. The temperature was increased to 85° C. by applying heat to the reactor. Then 100 grams of 4% (NH$_4$)$_2$S$_2$O$_8$ were added followed by 100 grams of water, and the latex was held at 85° C. for one hour.

After cooling and expelling the emulsion from the reactor, its properties were determined as follows:

| Non-volatile material | 56.86% |
|---|---|
| pH | 3.1 |
| Brookfield Viscosity | 448 centipoises |
| Weight % Ethylene in Polymer | 12% |
| Weight % Vinyl Chloride in Polymer | 8% |

The polymer displayed incomplete solubility and gel particle formation in acetone, methyl ethyl ketone, and benzene.

The resistance of a one-inch square film of the dried latex to aqueous alkali was determined according to the method of U.S. Pat. No. 3,632,542.

The weight loss was 2.75%.

The invention is defined in the claims which follow.

We claim:

1. A method of copolymerizing ethylene and vinyl acetate to produce a copolymer containing 5–40% ethylene exhibiting increased insolubility in acetone and aqueous caustic comprising copolymerizing ethylene and vinyl acetate monomers in an aqueous emulsion further containing at least 10% by weight of emulsified particles of a copolymer of at least 50% by weight of copolymerized vinyl acetate and 5–40% by weight of copolymerized ethylene, said vinyl acetate and ethylene monomers being present in the emulsion in an amount of at least 10% by weight of unreacted monomers in the emulsion, and said emulsion also containing redox catalysts to cause the unreacted monomers to copolymerize in a vigorous exothermic reaction.

2. A method as recited in claim 1 in which said ethylene monomer is used in an amount to provide a copolymer containing from 8–20% of ethylene.

3. A method as recited in claim 1 in which said unreacted monomers include vinyl chloride in an amount up to 30% by weight.

4. A method as recited in claim 1 in which said unreacted monomers include reactive monoethylenic monomer in an amount up to 2% by weight.

5. A method as recited in claim 4 in which said reactive monomer provides a reactive $CH_2OH$ group.

6. A method as recited in claim 1 in which said unreacted monomers include ethylenically unsaturated acid in an amount up to 2% by weight.

7. A method as recited in claim 1 in which the concentration of unreacted monomer in said emulsion of emulsified copolymer particles is at least 20%.

8. A method as recited in claim 1 in which the emulsion which is copolymerized includes hydroxy ethyl cellulose.

* * * * *

UNITED STATES PATENT OFFICE
CERTIFICATE OF CORRECTION

Patent No. 4,118,356      Dated October 3, 1978

Inventor(s) James E. Devona and Abdullah M. Rokadia

It is certified that error appears in the above-identified patent and that said Letters Patent are hereby corrected as shown below:

Column 1, line 67 change "of" to read --to-- .

Column 3, after line 36, insert

-- Example 1

Batch Redox Copolymerization of Vinyl Acetate and Ethylene in 3 Stages

The following materials were charged to a five gallon stainless steel autoclave equipped with a stirrer and temperature controls: --

Signed and Sealed this

Sixth Day of February 1979

[SEAL]

Attest:

RUTH C. MASON
*Attesting Officer*

DONALD W. BANNER
*Commissioner of Patents and Trademarks*